(12) United States Patent
Weber et al.

(10) Patent No.: US 12,272,516 B2
(45) Date of Patent: Apr. 8, 2025

(54) ROTARY ANODE BEARING ASSEMBLY AND ROTARY ANODE FOR X-RAY TUBE AND METHOD FOR ASSEMBLING A ROTARY ANODE BEARING ASSEMBLY

(71) Applicant: MINEBEA MITSUMI INC., Nagano (JP)

(72) Inventors: Florian Weber, Leutkirch (DE); Peter Andreas Muller, Leutkirch (DE); Alfred Sipple, Leutkirch (DE)

(73) Assignee: MINEBEA MITSUMI INC., Nagano (JP)

( * ) Notice: Subject to any disclaimer, the term of this patent is extended or adjusted under 35 U.S.C. 154(b) by 74 days.

(21) Appl. No.: 17/701,457

(22) Filed: Mar. 22, 2022

(65) Prior Publication Data
US 2022/0344122 A1 Oct. 27, 2022

(30) Foreign Application Priority Data
Apr. 23, 2021 (DE) .......................... 102021204081.0

(51) Int. Cl.
*H01J 35/10* (2006.01)
*H05G 1/02* (2006.01)

(52) U.S. Cl.
CPC ........... *H01J 35/1024* (2019.05); *H05G 1/02* (2013.01); *H01J 2235/1006* (2013.01); *H01J 2235/1046* (2013.01)

(58) Field of Classification Search
CPC ................... H01J 35/10; H01J 35/1024; H01J 2235/1046; H01J 2235/1006; H01J 2235/1053; H05G 1/02; F16C 19/163; F16C 19/548; F16C 27/04; F16C 35/067; F16C 2226/52; F16C 2229/00; F16C 2380/16

See application file for complete search history.

(56) References Cited

U.S. PATENT DOCUMENTS 7,970,104 B2 * 6/2011 Kaika ................. H01J 35/1024
378/132

* cited by examiner

*Primary Examiner* — Jurie Yun
(74) *Attorney, Agent, or Firm* — Faegre Drinker Biddle & Reath LLP

(57) ABSTRACT

The disclosure relates, inter alia, to a rotary anode bearing assembly for an X-ray tube comprising at least one bearing outer ring and rolling elements arranged within the at least one bearing outer ring, which rolling elements roll on the at least one bearing outer ring and enclose a radially inner receiving space for receiving a rotor of an X-ray tube; comprising a bearing housing in which the at least one bearing outer ring is mounted, wherein the bearing housing circumferentially surrounds the at least one bearing outer ring. The rotary anode bearing assembly according to the disclosure includes an end face of at least one bearing outer ring or of a caulking ring axially adjoining the bearing outer ring is caulked to an end face of the bearing housing by plastic deformation of material of the bearing housing and/or of the bearing outer ring and/or of the caulking ring.

15 Claims, 5 Drawing Sheets

Detail X

ROTARY ANODE BEARING ASSEMBLY AND ROTARY ANODE FOR X-RAY TUBE AND METHOD FOR ASSEMBLING A ROTARY ANODE BEARING ASSEMBLY

CROSS-REFERENCE TO RELATED APPLICATIONS

The present application claims priority to and the benefit of German Patent Application No. DE102021204081.0, filed Apr. 23, 2021, the entire disclosure of which is hereby expressly incorporated herein by reference.

BACKGROUND/SUMMARY

The present disclosure relates to a rotary anode bearing assembly for an X-ray tube, a rotary anode having a corresponding rotary anode bearing assembly, and a method for assembling a rotary anode bearing assembly for manufacturing a rotary anode.

Rotary anodes in X-ray tubes—for example, for a computed tomography (CT) scanner—require bearing assemblies that can handle the high speeds of the rotary anode about the longitudinal axis of its own rotor shaft. For example, these speeds are up to 9000 rpm or more. In addition, when the rotary anode is arranged in an X-ray tube of a CT scanner, the rotary anodes must be able to withstand the considerable loads caused by rotation of the X-ray tube around the scanner axis, wherein 40 times the acceleration due to gravity can act on the X-ray tube and thus the rotary anode bearing assembly as a result of the X-ray tube rotating around the scanner axis.

Conventional rotary anode bearing assemblies are often designed to be preloaded and temperature-compensated. Typically, in such a rotary anode bearing assembly, at least two outer rings are mounted in a bearing housing which is pot-shaped and thus closed on one side. In this case, the front (or outer) of the two bearing outer rings, i.e. the bearing outer ring closer to the pot opening, can be designed with a flange. The flange is used to fix the bearing outer rings in the bearing housing by means of a screw connection and thus to achieve axial securing of the bearing outer rings in both axial directions.

The flange connected to the front outer ring extends radially outward along an end face of the bearing housing and has corresponding bores through which axially directed screws are screwed into the end face of the bearing housing. Accordingly, there must be sufficient radial space in the bearing housing to allow the screws to be inserted. However, the bearing housing in such a rotary anode is circumferentially enclosed by a pot-shaped region of the rotor of the X-ray tube, wherein the rotor interacts electromagnetically with a stator circumferentially enclosing the rotor in order to drive the rotor electrically. The pot-shaped area of the rotor therefore limits the maximum possible outer diameter of the bearing housing and thus the area available on the face side in the bearing housing for inserting the screws. This solution is therefore not suitable for comparatively thin bearing housing wall thicknesses.

Other disadvantages of the flange on the front bearing outer ring are the additional axial installation space required on the front side of the bearing housing and the expense of the screws and of screw locking.

Another known solution is to secure the front bearing outer ring axially in the bearing housing in one direction using a snap ring. However, this requires the bearing housing to protrude beyond the bearing outer ring on the end face, which in turn requires additional axial installation space. In addition, the snap ring can only be secured axially in one axial direction. For securing all bearing outer rings and the associated bearing components in both axial directions, at least one additional element is required.

The present disclosure is based on the object of providing a rotary anode bearing assembly and a method for mounting a rotary anode bearing assembly, wherein the rotary anode bearing assembly requires a particularly small installation space for securing the at least one bearing outer ring in the bearing housing, enables axial securing of the at least one bearing outer ring in both axial directions in the bearing housing, is reliable and can be manufactured inexpensively.

The object according to the disclosure is solved by a rotary anode bearing assembly and a method for assembling a rotary anode bearing assembly with the features of the independent patent claims. The dependent patent claims describe advantageous further developments as well as a rotary anode for an X-ray tube.

A rotary anode bearing assembly for an X-ray tube according to the disclosure comprises at least one bearing outer ring, preferably at least two or exactly two bearing outer rings, and rolling elements arranged inside the at least one bearing outer ring, which rolling elements roll on the at least one bearing outer ring and enclose a radially inner receiving space for receiving a rotor of an X-ray tube, in particular its rotor shaft.

A bearing housing is provided in which the at least one bearing outer ring is mounted, wherein the bearing housing surrounds the at least one bearing outer ring in the circumferential direction, in particular directly. For example, the at least one bearing outer ring can be inserted into the bearing housing with an interference fit or loose fit. In particular, the bearing housing has a pot-shaped configuration with a closed bottom and an open end, wherein at least one bearing outer ring is arranged axially adjacent to the open end and can thus be referred to as a front bearing outer ring. The rotor or rotor shaft inserted into the housing then protrudes from the open end of the bearing housing in the axial direction.

An inner contour of the bearing housing, which is radially opposite the bearing outer ring or rings, can, as will be described below, in particular have at least two axial sections with mutually different inner diameters. In this way, at least one collar can be created on the bearing housing, on which a bearing outer ring is supported in the axial direction.

According to a first embodiment of the disclosure, an end face of at least one bearing outer ring or of a caulking ring axially adjoining the bearing outer ring is caulked to an end face of the bearing housing by plastic deformation of material of the bearing housing and/or of the bearing outer ring and/or of the caulking ring. Accordingly, the caulking ring may be located between the front bearing outer ring and the end face at the open end of the bearing housing. If no caulking ring is provided, the end face of the front bearing outer ring can accordingly be provided at the open end of the bearing housing.

The caulking is preferably carried out at several positions of the end faces arranged one behind the other in the circumferential direction. The individual positions of caulking can in particular be arranged at a distance from each other.

Preferably, the bearing outer ring, i.e. the front bearing outer ring, i.e. the bearing outer ring caulked directly or via the caulking ring with the bearing housing, is spring-preloaded with a spring element in the direction of the caulked end face. This is therefore a preloaded rotary anode bearing assembly which can preferably also be designed to be temperature-compensated, as was shown at the beginning. The spring element can preferably be arranged between bearing outer rings inserted axially adjacent to one another in the bearing housing, in particular the two said bearing outer rings at the open end and adjacent to the bottom of the bearing housing, and press the bearing outer rings apart, if necessary via one or more intermediate, axially displaceable components, in order to brace the entire bearing assembly.

In particular, the bearing outer ring is clamped in the axial direction between material of the bearing housing plastically deformed by the caulking and a collar of the bearing housing arranged at an axial distance from the deformed material. This enables reliable and defined axial positioning and securing of the bearing outer ring in both axial directions.

Particularly preferably, the material plastically deformed during caulking is deformed in the axial direction and in the radial direction of the at least one bearing outer ring, i.e. in the axial direction and in the radial direction of the rotary anode bearing assembly. Thus, axial and radial securing of the bearing outer ring can be achieved. The axial direction corresponds to the direction of the axis of rotation of the rotor of the X-ray tube.

Particularly preferably, two bearing outer rings arranged side by side in the axial direction are mounted in the bearing housing, for example the said front bearing outer ring and a corresponding rear bearing outer ring near the bottom of the bearing housing, wherein the two bearing outer rings are supported against one another in the axial direction directly or via at least one intermediate piece, preferably being elastically supported against one another, and together enclose the receiving space. Preferably, only one of the two bearing outer rings can be caulked to the bearing housing directly or via the caulking ring. At the same time, the mutual support also secures the other bearing outer ring, which can preferably be supported on a base of the bearing housing or on a collar of the bearing housing.

The two bearing outer rings can have the same inner and outer diameters.

In an embodiment with a caulking ring, it is particularly advantageous if the caulking ring has a lower hardness than the bearing housing and the at least one bearing outer ring. This means that the caulking ring can be provided as a buffer or as a sacrificial part, so that when the material of the bearing housing is caulked in the caulking ring, deformation only occurs in the caulking ring, but not in the axially adjacent bearing outer ring. This ensures that small tolerances are maintained in the roundness of the bearing outer ring, which results in correspondingly smooth running of the rotary anode bearing assembly.

The caulking ring can rest loosely on the bearing outer ring, either directly or via an intermediate element, or it can be mounted in a form-fit or material-fit manner.

Particularly preferably, the at least one bearing outer ring and the caulking ring, and in particular the bearing housing, have the same coefficient of thermal expansion. In this way, yielding of the caulking or the occurrence of undesirable clearance between the at least one bearing outer ring and the bearing housing can be avoided.

According to an alternative embodiment of the disclosure, which can also be combined with the first embodiment, at least one latching element is arranged in the radial direction between the bearing housing and the at least one bearing outer ring, in particular the front bearing outer ring, which latching element can be displaced by a spring force or other deformation force that can be activated from the outside from a retracted position into an extended position between the bearing housing and the at least one bearing outer ring, in particular the front bearing outer ring, wherein in the retracted position it permits a relative movement between the bearing housing and the at least one bearing outer ring (front bearing outer ring) in the axial direction and in the extended position it locks on both sides in the axial direction by positive locking.

In particular, several latching elements arranged at a distance from one another in the circumferential direction are provided over the circumference of the bearing outer ring, or one latching element extends over at least half or at least three quarters of the outer circumference of the bearing outer ring. As a result, securing is achieved over virtually the entire circumference of the bearing outer ring and tilting moments are avoided.

Also in this second embodiment of the disclosure, two bearing outer rings arranged next to each other in the axial direction are preferably mounted in the bearing housing, which are supported against each other in the axial direction, in particular elastically supported against each other, directly or via at least one intermediate piece, as shown previously, and together enclose the receiving space, wherein at least one latching element is arranged between only one of the two bearing outer rings and the bearing housing. The other bearing outer ring can be secured in the axial direction by its support against the front bearing outer ring and a base of the housing or a collar in the housing, as shown previously.

The two bearing outer rings can have the same inner and outer diameters.

According to one embodiment, the at least one latching element is designed as a spring ring. The spring ring can be made of an elastically resilient material or can be displaced, i.e. sprung, from the retracted position to the extended position by additional springs.

According to another embodiment, the at least one latching element is manufactured as a ring from a shape memory material, for example from a shape memory alloy, and the form fit between the bearing outer ring and the bearing housing can be produced by a property change, i.e. a so-called memory effect. For example, the property change may be a temperature change or irradiation of the shape memory material.

The latching element is mounted in particular in a radial groove in the bearing outer ring and, in the extended position, extends into a radial recess in the bearing housing opposite the radial groove in the bearing outer ring. In the retracted position, the latching element is then completely retracted from the radial recess and, in particular, is arranged completely within the radial groove in the bearing outer ring.

A rotary anode for an X-ray tube according to the disclosure comprises a rotor and a stator circumferentially enclosing the rotor at a distance, wherein the rotor and the stator are in electromagnetic interaction with each other and wherein the rotor has a pot-shaped region circumferentially enclosing a rotor shaft mounted on rolling bearings and connected to an axial end of the rotor shaft, in one piece or in several pieces. The rotor is supported by a rotary anode bearing assembly of the type shown in accordance with the disclosure, and the rotor shaft is disposed in the receiving space so that the bearing housing is disposed between the rotor shaft and the pot-shaped region of the rotor in the radial direction.

A method for assembling a rotary anode bearing assembly for manufacturing a rotary anode according to the disclosure comprises the following steps:

Insertion of the rolling elements into the at least one bearing outer ring, of the rotor shaft of the rotor into the radially inner receiving space and of the at least one bearing outer ring into the bearing housing;

Caulking of the end face of at least one bearing outer ring or of the caulking ring axially adjoining the bearing outer ring with the end face of the bearing housing by plastic deformation of the material of the bearing housing and/or of the bearing outer ring and/or of the caulking ring;

where the caulking takes place with the rotor shaft inserted into the radially inner receiving space.

Preferably, at least one caulking body is displaced radially from the outside down to the material, wherein the at least one caulking body is immersed in a space between a flange on the rotor shaft and the end face of the bearing housing, and subsequently, in particular, a force is applied to the at least one caulking body in the axial direction of the rotor shaft, thereby deforming the material to produce the caulking.

BRIEF DESCRIPTION OF THE DRAWINGS

The disclosure will be explained below by way of exemplary embodiments and the figures, wherein.

DETAILED DESCRIPTION

Figure 1:
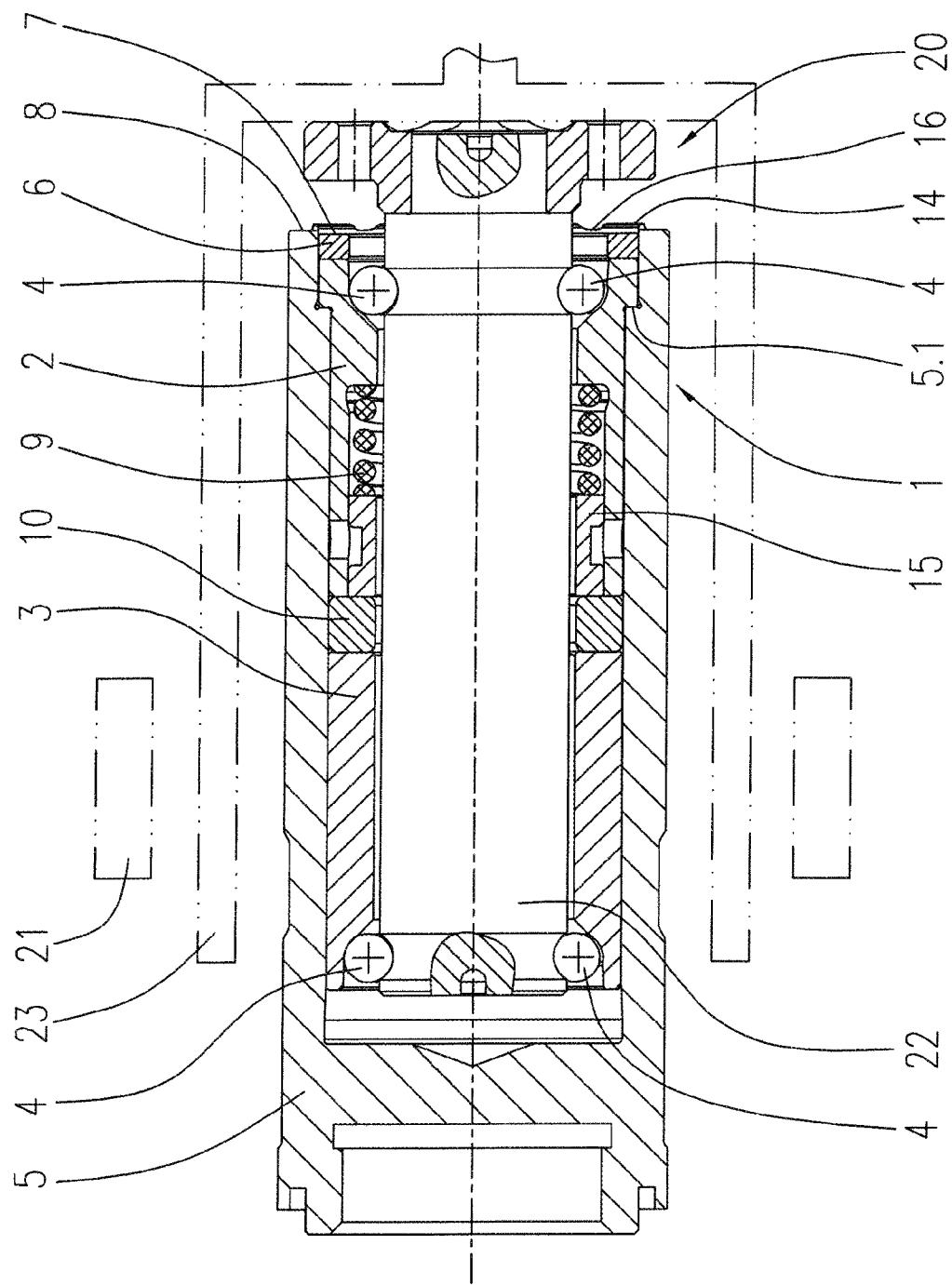
FIG. 1 shows an axial section through an embodiment of a rotary anode bearing assembly according to the disclosure in a rotary anode for an X-ray tube.

In FIG. 1, a rotary anode bearing assembly 1 of a rotary anode for an X-ray tube according to the disclosure is shown. With the rotary anode bearing assembly, a rotor 20 of the rotary anode is mounted in rolling bearings, wherein the rotor 20 encloses the bearing housing 5 with a pot-shaped region 23, which is shown in dashed line, and the pot-shaped region 23 is connected to a rotor shaft 22, which rotates about an axis of rotation during operation of the X-ray tube, which is arranged in a receiving space of the rotary anode bearing assembly within the rolling elements 4, which roll radially inwardly in two bearing outer rings 2, 3. In the exemplary embodiment shown, the rotor shaft 22 also forms the bearing inner rings for the rolling elements 4. However, this is not mandatory.

In practice, the rotor shaft 22 is followed by an anode plate with anode material, which is not shown in detail here.

A stator 21 is located radially opposite the rotor 20 or its pot-shaped region 23, wherein the rotor 20 is arranged within an X-ray tube housing (not shown), in particular made of glass, and the stator 21 is positioned outside the X-ray tube housing.

The bearing housing 5 is pot-shaped, wherein one of the two bearing outer rings, in this case the bearing outer ring 3, is directly or indirectly supported on a bottom of the pot-shaped housing and the other bearing outer ring 2 is positioned near the opening of the bearing housing 5. Accordingly, the bearing outer ring 3 may be referred to as the rear bearing outer ring and the bearing outer ring 2 may be referred to as the front bearing outer ring.

An intermediate piece 10 is arranged between the two bearing outer rings 2, 3 in the axial direction, here in the form of a C-ring which is interrupted over the circumference. The two bearing outer rings 2, 3 are supported against each other in the axial direction via the intermediate piece 10. A resilient support is provided, which is achieved by arranging in the bearing outer ring 2 a thrust element 15 acted upon by the spring element 9, which is pressed elastically against the intermediate piece 10 by the spring element 9 and slides radially inwards on a surface in the bearing outer ring 2. The thrust element 15 has an outer circumferential groove by means of which it can be secured in the axial direction by means of a pin, not shown here, which is pushed through a corresponding bore in the bearing outer ring 2, in order to resist the spring force of the spring element 9 and not to be pressed out of the bearing outer ring 2 before the intermediate piece 10 is inserted between the bearing outer rings 2, 3.

However, the elastic support between the two bearing outer rings 2, 3 could also be designed differently.

In the area of the opening of the bearing housing 5, a caulking ring 6 is provided on the end face of the bearing outer ring 2, which serves to fix the bearing outer ring 2 in the bearing housing 5 in the axial direction and radial direction. The caulking ring 6 advantageously adjoins the bearing outer ring 2 with the same diameter. In the area of its front end, the bearing outer ring 2 has a radial extension which abuts against a collar 5.1 of the bearing housing 5. The bearing housing 5 has axially projecting material 14 on its end face 8, which is shown in FIG. 1 in the not yet deformed state.

According to a preferred embodiment, but not mandatory, the material 14 is annular and may in particular have notches 16 spaced apart in the circumferential direction of the bearing housing 5. The notches 16 facilitate caulking of the material 14 by bending it in the direction of the caulking ring 6.

Figure 2:
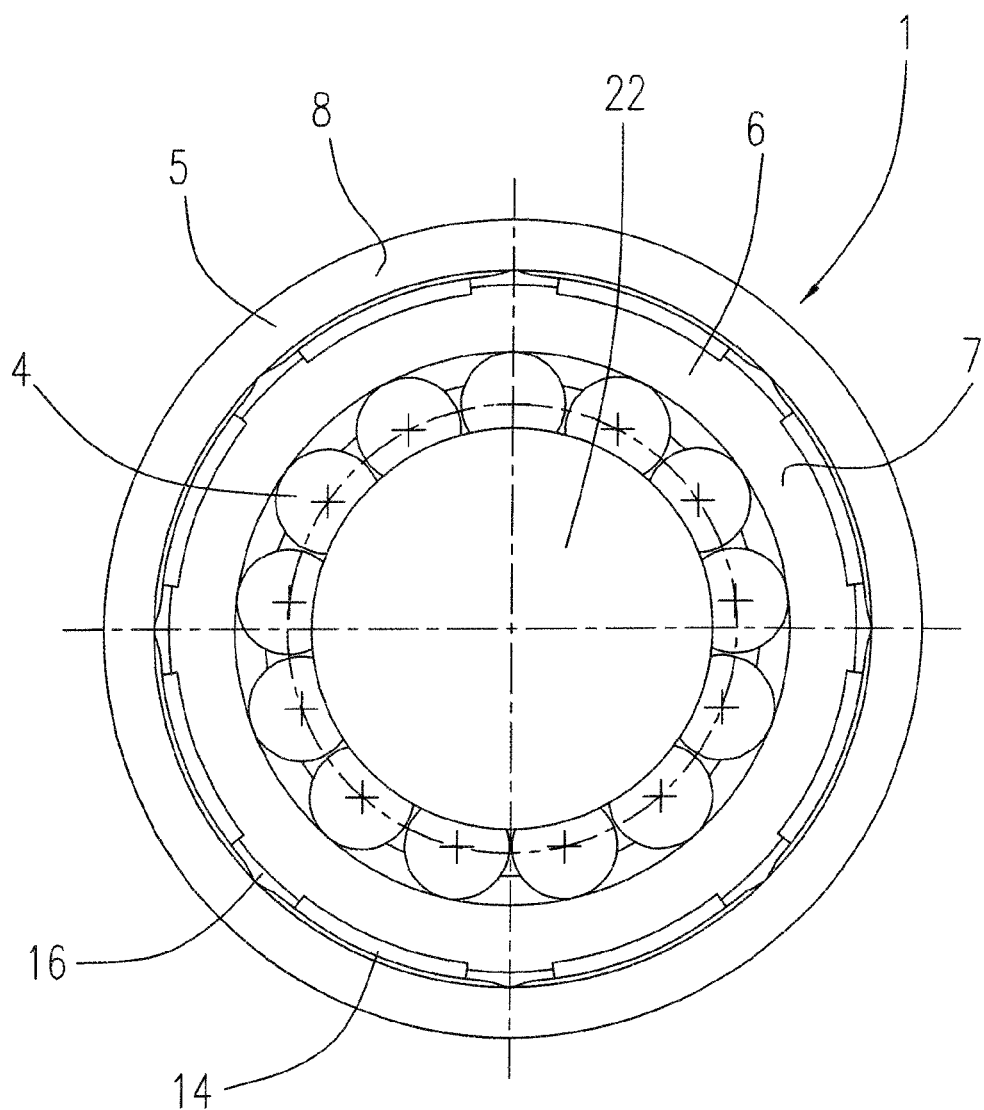
FIG. 2 shows an axial plan view of the caulking of the bearing outer ring in the bearing housing of FIG. 1.

FIG. 2 shows the caulked state of the end face 7 of the caulking ring 6 with the end face 8 of the bearing housing 5. As can be seen, the material 14 is bent radially inward and pressed into the material of the caulking ring 6 at its end face 7. FIG. 2 accordingly shows a top view of the end faces 7, 8.

The fact that the material of the caulking ring 6 is preferably comparatively soft, in particular softer than the material of the bearing housing 5 and preferably also than the material of the bearing outer ring 2, makes it easy to introduce the material 14 into the material of the caulking ring 6. At the same time, undesirable deformation of the bearing outer ring 2 is avoided.

Figure 6:
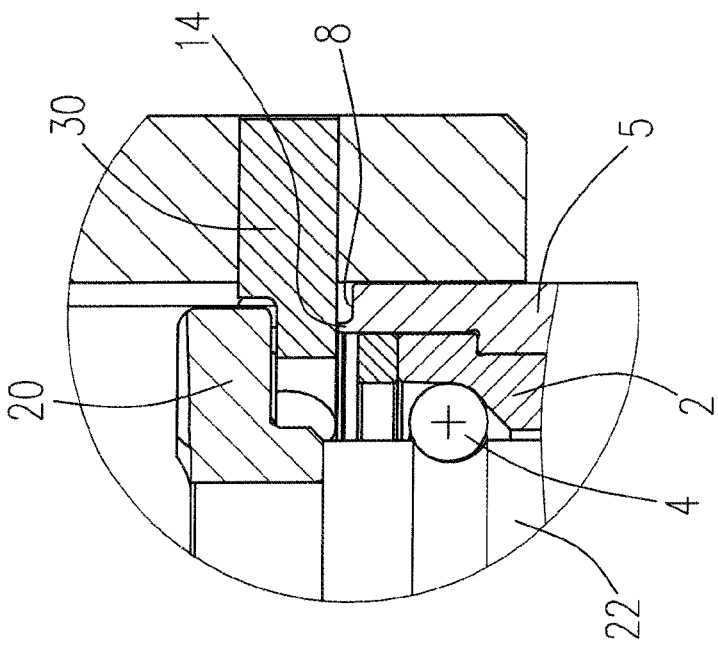
FIG. 6 shows an enlargement of the area with the not yet plastically deformed material of the bearing housing before caulking of this material.
Figure 5:
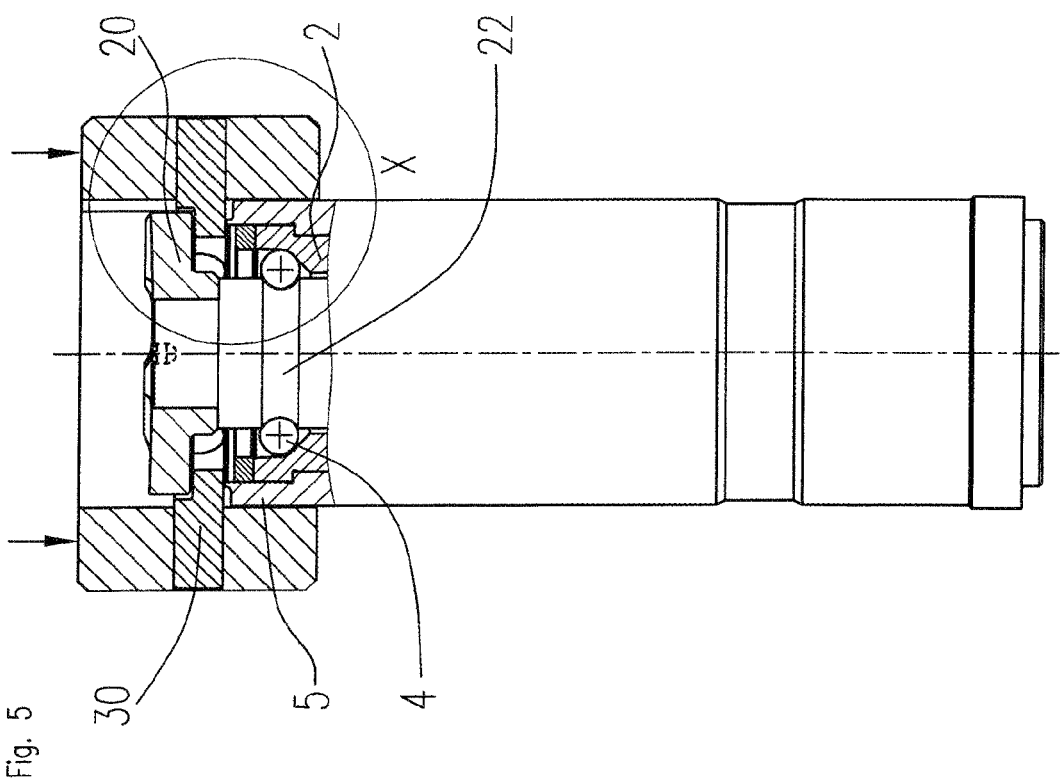
FIG. 5 shows a tool or device for applying the caulking of a rotary anode bearing assembly according to the disclosure.

FIGS. 5 and 6 show a possible device for caulking the material 14. As can be seen, a caulking body 30 is displaced radially from the outside down to the material 14 on the bearing housing 5, wherein the caulking body 30 dips into the space between a flange on the rotor 20 or on the rotor shaft 22 and the end face 8 of the bearing housing 5. Subsequently, a force, represented by the arrow in FIG. 5, can be applied in the axial direction to the or several circumferentially oriented caulking bodies 30 arranged one behind the other in order to deform the material 14 for producing the caulking between the bearing housing 5 and the bearing outer ring 2, or in this case the caulking ring 6.

Figure 3:
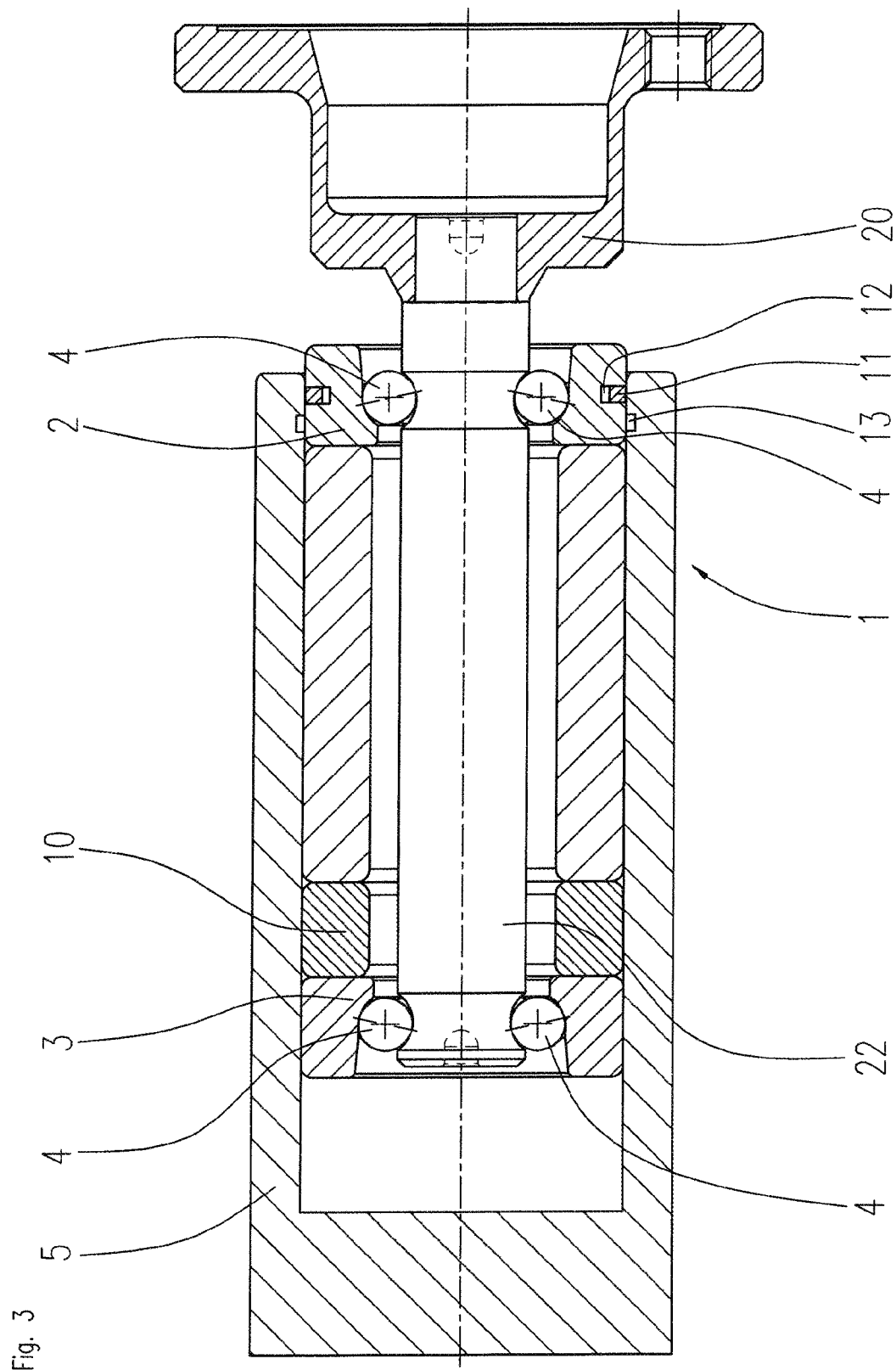
FIG. 3 shows an alternative exemplary embodiment of a rotary anode bearing assembly according to the disclosure having a latching element in the retracted position before the bearing outer rings are fully inserted into the bearing housing.
Figure 4:
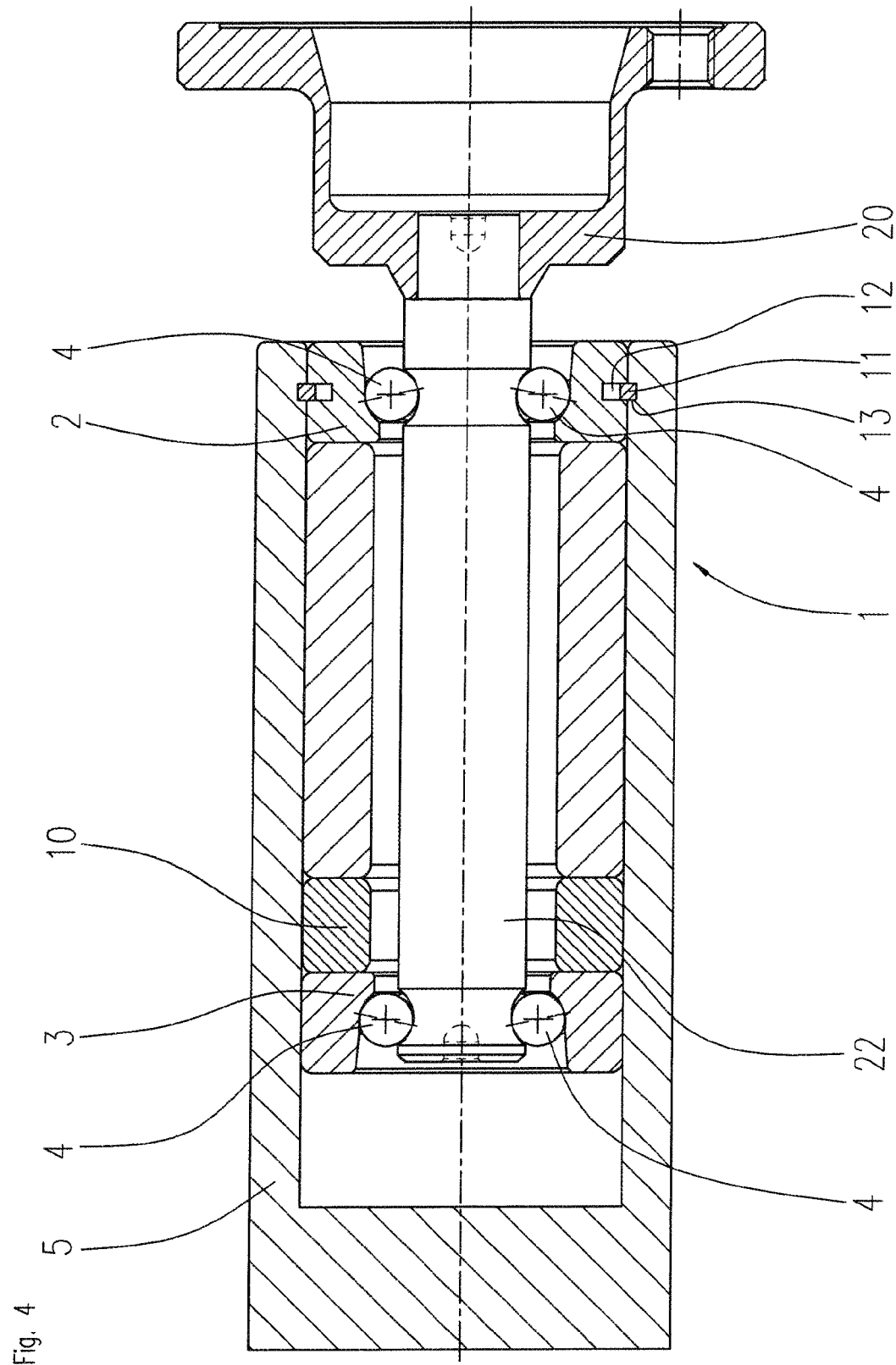
FIG. 4 shows the rotary anode bearing assembly from FIG. 3 with the latching element in the extended position after the bearing outer rings have been fully inserted into the bearing housing.

FIGS. 3 and 4 show an alternative embodiment of the disclosure, in which a latching element 11 is provided in the bearing outer ring 2, which is displaceable between a retracted position within a radial groove 12 in the bearing outer ring 2 and an extended position, in which it is arranged partly within the radial groove 12 and partly within a radial recess 13 in the bearing housing 5. The retracted position is shown in FIG. 3, and the extended position is shown in FIG. 4. The extended position is reached when the two bearing outer rings 2, 3 together with the intermediate piece 10, the rolling elements 4 and the part of the rotor 20 arranged in the receiving space between the rolling elements 4, in this case the rotor shaft 22, have been completely pushed into the bearing housing 5, so that the radial groove 12 and the radial recess 13 are directly opposite one another in the radial direction and the latching element 11 has been deformed or pressed radially outwards by a spring force or another deformation force which can be activated specifically from outside, in order to engage correspondingly in the radial recess 13.

Also in the exemplary embodiment shown in FIGS. 3 and 4, a resilient support could be provided between the bearing outer ring 2 and the bearing outer ring 3, for example by the intermediate piece 10 being resilient, or also by means of a spring arrangement as shown in FIG. 1. Other, also non-resilient, embodiments are possible.

LIST OF REFERENCE SIGNS

1 Rotary anode bearing assembly
2 Bearing outer ring
3 Bearing outer ring
4 Rolling element
5 Bearing housing
5.1 Collar
6 Caulking ring
7 End face
8 End face
9 Spring element
10 Intermediate piece
11 Latching element
12 Radial groove
13 Radial recess
14 Material
15 Thrust element
16 Notch
20 Rotor
21 Stator
22 Rotor shaft
23 Pot-shaped region
30 Caulking body

The invention claimed is:
1. A rotary anode bearing assembly for an tube,
comprising at least one bearing outer ring and rolling elements arranged inside the at least one bearing outer ring, which robin elements roll on the at least one bearing outer ring and enclose a radially inner receiving space for receiving a rotor of an X-ray tube,
comprising a bearing housing in which the at least one bearing outer ring is mounted, wherein the bearing housing circumferentially surrounds the at least one bearing outer ring;
characterized in that
an end face of at least one bearing outer ring or of a caulking ring axially adjoining the hearing outer ring is caulked with an end face of the bearing, housing by plastic deformation of material of the bearing housing and/or of the ba atinz outer nng and; or of the caulking ring.

2. The rotary anode bearing assembly according to claim 1, characterized in that the bearing outer ring is spring-preloaded with a spring element in the direction of the caulked end face.

3. The rotary anode bearing assembly according to claim 2, characterized in that the bearing outer ring is clamped on both sides in the axial direction between material of the bearing housing plastically deformed by the caulking and a collar of the bearing housing arranged at an axial distance from the deformed material.

4. The rotary anode bearing assembly according to claim 2, characterized in that the material is deformed in the axial direction and radial direction of the at least one bearing outer ring.

5. The rotary anode bearing assembly according to claim 2, characterized in that two bearing outer rings arranged adjacent to each other in the axial direction are mounted in the bearing housing, which are supported against each other in the axial direction directly or via at least one intermediate piece and jointly enclose the receiving space, wherein only one of the two bearing outer rings is caulked to the hearing housing directly or via the caulking ring.

6. The rotary anode bearing assembly according to claim 1, characterized in that the bearing outer ring is clamped on both sides in the axial direction between material of the bearing housing, plastically deformed by the caulking and a collar of the bearing housing arranged at an axial distance from the deformed material.

7. The rotary anode bearing assembly according to claim 6, characterized in that the material is deformed in the axial direction and radial direction of the at least one bearing outer ring.

8. The rotary anode bearing assembly according to claim 1, characterized in that the material is deformed in the axial direction and radial direction of the at least one bearing outer ring.

9. The rotary anode hearing assembly according to claim 1, characterized in that two bearing outer rings arranged adjacent to each other in the axial direction are mounted in the bearing housing, which are supported against each other in the axial direction directly or via at least one intermediate piece and jointly enclose the receiving space, wherein only one of the two bearing outerrings is caulked to the bearing housing directly or via the caulking ring.

10. The rotary anode bearing assembly according to claim 9, characterized in that the two hearing outer rings are elastically supported against each other.

11. The rotary anode bearing as sem bl according to claim 1, characterized in that the caulking ring has a lower hardness than the bearing housing and the at least one bearing outer ring.

12. The rotary anode bearing assembly according to claim 1, characterized in that the at least one bearing outer ring and the caulking ring have the same coefficient of thermal expansion.

13. A rotary anode for an X-ray tube,
comprising a rotor and a stator circumferentially surrounding the rotor at a distance therefrom, wherein the rotor and the stator are in electromagnetic interaction. with each other and wherein the rotor has a pot-shaped region circumferentially surrounding a rotor shaft of the rotor mounted on rolling bearings and connected to an axial end of the rotor shaft, characterized in that the rotor is supported by a rotary anode bearing assembly according to claim 1, and the rotor shaft is arranged in the receiving space so that the bearing housing is arranged in the radial direction between the rotor shaft and the pot-shaped region.

14. A method for assembling a rotary anode bearing assembly according to claim 1 for manufacturing a rotary anode, comprising the following steps of:

inserting the robing elements into the at least one bearing outer ring, a rotor shaft of the rotor into the radially inner receiving space and the at least one bearing outer ring into the bearing housing;

caulking of the end face of at least one bearing outer ring or of the caulking ring axially adjoining the bearing outer ring with the end face of the bearing housing by plastic deformation of the material of the bearing housing and/or of the bearing miter ring and/or of the caulking ring;

characterized in that the caulking, takes place with the rotor shaft inserted in the radially inner receiving space.

15. The method according to clam 14, characterized in that at least one caulking body is displaced radially from the outside down to the material, wherein the at least one caulking body is immersed into a space between a flange on the rotor shaft and the end face-of the bearing housing.

* * * * *